United States Patent
Kim et al.

(10) Patent No.: US 12,399,946 B1
(45) Date of Patent: Aug. 26, 2025

(54) DRAM-RRAM HYBRID MEMORY SYSTEM FOR RECOMMENDATION MODELS

(71) Applicant: The Regents of The University of Michigan, Ann Arbor, MI (US)

(72) Inventors: Heewoo Kim, Ann Arbor, MI (US); Haojie Ye, Ann Arbor, MI (US); Trevor Mudge, Ann Arbor, MI (US); Ronald Dreslinski, Ann Arbor, MI (US); Nishil Talati, AnnArbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 0 days.

(21) Appl. No.: 18/795,332

(22) Filed: Aug. 6, 2024

(51) Int. Cl.
  *G06F 16/9535* (2019.01)
  *G06F 16/957* (2019.01)
(52) U.S. Cl.
  CPC ........ *G06F 16/9535* (2019.01); *G06F 16/957* (2019.01)
(58) Field of Classification Search
  CPC .......................... G06F 16/9535; G06F 16/957
  See application file for complete search history.

(56) References Cited

U.S. PATENT DOCUMENTS

2019/0206487 A1* 7/2019 Chen .................... G11C 13/004
2019/0384708 A1* 12/2019 Park .................... G06F 12/0868

OTHER PUBLICATIONS

Kal, Hongju, et al. "Space: locality-aware processing in heterogeneous memory for personalized recommendations." 2021 ACM/IEEE 48th Annual International Symposium on Computer Architecture (ISCA). IEEE, 2021.
Lee, Yejin, et al. "MERCI: efficient embedding reduction on commodity hardware via sub-query memoization." Proceedings of the 26th ACM International Conference on Architectural Support for Programming Languages and Operating Systems. 2021.
Kwon, Youngeun, Yunjae Lee, and Minsoo Rhu. "Tensordimm: A practical near-memory processing architecture for embeddings and tensor operations in deep learning." Proceedings of the 52nd Annual IEEE/ACM International Symposium on Microarchitecture. 2019.
Ke, Liu, et al. "Recnmp: Accelerating personalized recommendation with near-memory processing." 2020 ACM/IEEE 47th Annual International Symposium on Computer Architecture (ISCA). IEEE, 2020.

(Continued)

*Primary Examiner* — Apu M Mofiz
*Assistant Examiner* — Oscar Wehovz
(74) *Attorney, Agent, or Firm* — Harness, Dickey & Pierce, P.L.C.

(57) ABSTRACT

The performance of modern recommendation models is limited because of the memory bandwidth-hungry embedding layer reductions. A novel hybrid memory system is presented with DRAM and RRAM with PIM capability. The performance of traditional RRAM PIM is limited by the latency of bit-serial computation. The hybrid memory system presents a comprehensive optimization approach that includes access-pattern aware mapping, compute complexity reduction, and selective PIM reduction to offset this computation latency. An evaluation shows that the hybrid memory system offers significant performance, energy, and EDP improvement of 2.6x, 1.7x, and 4.4x, on average, compared to a CPU baseline.

8 Claims, 6 Drawing Sheets

(56) References Cited

OTHER PUBLICATIONS

Asgari, Bahar, et al. "Fafnir: Accelerating sparse gathering by using efficient near-memory intelligent reduction." 2021 IEEE International Symposium on High-Performance Computer Architecture (HPCA). IEEE, 2021.

Ye, Haojie, et al. "Grace: A Scalable Graph-Based Approach to Accelerating Recommendation Model Inference." Proceedings of the 28th ACM International Conference on Architectural Support for Programming Languages and Operating Systems, vol. 3. 2023.

* cited by examiner

DRAM-RRAM HYBRID MEMORY SYSTEM FOR RECOMMENDATION MODELS

GOVERNMENT CLAUSE

This invention was made with government support under FA8650-18-2-7864 awarded by the U.S. Air Force. The government has certain rights in the invention.

FIELD

The present disclosure relates to a hybrid memory system for recommendation models.

BACKGROUND

Deep Learning Recommendation Models (DLRM) are widely deployed in today's data centers to predict user preferences and deliver personalized advertisements. DLRM inference occupies more than 60% of AI inference cycles in commercial data centers. The DLRM workload consists of a combination of dense Multi-Layer Perceptron (MLP) layers and sparse embedding layers. Out of these, the embedding layer operation takes a majority (around 80%) of DLRM execution time, and is bottlenecked by the high memory bandwidth requirement. Therefore, optimizing the embedding layer performance is essential to improving data center performance and energy consumption, leading to a significant reduction in computing's carbon footprint and Total Cost of Ownership (TCO).

Prior works employ DRAM-based Near Memory Processing (NMP) or frequent embedding partial sum caching to improve DLRM performance. Several emerging memory technologies (e.g., RRAM and PCM) offer low cost-per-bit and improved technology scaling compared to DRAM. Given the ever-growing sizes of modern DLRM embedding tables, the performance of DLRM inference can be further improved using emerging memory technologies.

In this disclose, a novel hybrid memory system design using DRAM and Resistive RAM (RRAM) is introduced (also referred to herein as RecPIM). RecPIM employs a massively parallel Processing-In-Memory (PIM) technique called Memristor Aided IoGIC (MAGIC) for speeding up DLRM's sparse embedding layer computation in RRAM. DRAM, on the other hand, is used as the main memory. The core intuition behind this design choice is to exploit the high memory bandwidth available to RRAM PIM for reducing bandwidth-intensive embedding vectors. Despite high bandwidth availability, one of the key design challenges in achieving high performance is the bit-serial nature of MAGIC computation. The latency of PIM arithmetic operations is especially exacerbated in the case of floating point inputs, widespread in the DLRM workload. Therefore, a careful design of the DRAM-RRAM memory system is crucial to achieving high performance.

This section provides background information related to the present disclosure which is not necessarily prior art.

SUMMARY

This section provides a general summary of the disclosure, and is not a comprehensive disclosure of its full scope or all of its features.

In one aspect, a computer-implemented method is presented for processing embedding layers of a model. The method includes: receiving a historical data set of items accessed by users of a computer system, where each entry in the historical data set indicates a subset of items accessed by a given user; generating embedding vectors for items contained in the historical data set of items; determining most frequently accessed items in the historical data set of items; storing embedding vectors for the most frequently accessed items in a resistive random-access memory; and storing embedding vectors for remaining items in the historical data set of items in a dynamic random-access memory.

In some embodiments, elements of a given embedding vector are partitioned across different memory devices the elements from the given embedding vector are stored at the same address in the memory devices.

The most frequently accessed items are preferably determined empirically to balance processing time between the resistive random-access memory and the dynamic random-access memory.

In an example embodiment, the most frequently accessed items are determined by converting the historical data set of items to an item listing of common users, where each item in the historical data set of items is represented by an entry in the item listing of common users and each entry in the item listing of common users identifies a given item and a listing of users who accessed the given item; generating a user set of common items from the item listing of common users by combining entries in the item listing of common users with same listing of users; and ordering entries in the user set of common items in descending order according to number of common items in each entry in the user set of common items.

During runtime, the method may further include: receiving a list of items for a particular user, where the particular user has shown an interest in each item on the list of items; for each item on the list of items, retrieving partial sums for given items from the resistive random-access memory or retrieving the given items directly from the dynamic random-access memory; and performing a dimensionality reduction for items in the list of items using the retrieved partial sums and the retrieved items.

Alternatively, the method may include: receiving a list of items for a particular user, where the particular user has shown an interest in each item on the list of items; determining a number of parallel reduction operations to be performed in the resistive random-access memory and comparing the number of parallel reduction operations to a threshold; performing dimensionality reduction for items in the list of items in the resistive random-access memory when the number of parallel reduction operations is greater than the threshold; and performing dimensionality reduction for items in the list of items using the computer processor when the number of parallel reduction operations is less than the threshold.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

DLRM predicts and recommends items preferred by different users based on their attributes and previous user-item interactions. DLRM consists of MLP layers and embedding layers. MLP layers are used to process the dense and continuous features, such as user characteristics. The embedding layer is used to process sparse and categorical features, such as the users' previous selections.

The embedding layer typically employs several embedding tables for different item categories. The primary computation in this layer includes reading embedding vectors (consisting of a large vector of floating point numbers) from large embedding tables and performing element—wise floating—point additions (i.e., reductions). Typical embedding tables have several million vectors, and each user reads 10s to 100s of these vectors at inference. The accessed indices are determined by each user's past interactions with items at runtime, which are not typically contiguous. As a result, several long embedding vectors are fetched that are far away from one another in the address space. Therefore, embedding vector reduction is a memory bandwidth intensive operation that takes up to 80% of DLRM inference time. The focus of this disclosure is to optimize the memory bandwidth—hungry sparse embedding layer in DLRM.

Resistive random-access memory (RRAM) is an emerging non-volatile memory technology. RRAM stores the memory state using a resistance, as opposed to electrical charge in DRAM. Due to the resistive nature of RRAM cells, it is possible to compute logic operations within RRAM arrays. This disclosure uses RRAM to perform arithmetic operations using Memristor Aided loGIC (MAGIC). MAGIC enables the execution of bitwise logical NOR operations that can be conducted within the RRAM arrays. Because NOR is functionally complete, it is possible to execute any arithmetic/logical operation using a series of NOR gates. Further information regarding MAGIC NOR operations are described by N. Talati et al in "Logic design within memristive memories using memristor-aided logic" TNANO vol. 15 (2016) which is incorporated by reference herein.

There are two major advantages of PIM in RRAM using MAGIC NOR operations. First, MAGIC NOR can be performed with the RRAM memory arrays by applying voltages to bitlines/wordlines, without reading data outside. This exposes massive data bandwidth for computation. Second, MAGIC executes NOR operations in parallel for all data present in bitlines/wordlines as well as different RRAM crossbars, enabling a massively parallel in-memory computation engine.

Although the RRAM technology offers PIM capability with massive memory bandwidth available to computation and large opportunities of parallelism, simply employing RRAM PIM is not an attractive solution. The bit-serial nature of PIM results in long-latency arithmetic operations that require a large amount of parallelism to amortize the cost of bit-serial computation. For example, 1144 NOR cycles are required to add two 32-bit floating point numbers. This, in fact, results in a net performance slowdown compared to the CPU baseline, obviating the performance benefits of PIM. Therefore, to meaningfully continue delivering high performance using PIM within RRAM, it is critical to rethink the RRAM system design.

While the RRAM-based MAGIC NOR operations can exploit abundant in-RRAM memory bandwidth by performing computation within the memory arrays, one of the key constraints of being able to exploit this bandwidth is data co-location. That is, the input operands to PIM computation must be present in the same RRAM memory arrays. If the inputs are present in different RRAM banks, it becomes necessary to move data within the memory, offsetting the benefits expected from PIM. Furthermore, the sparse nature of embedding vector reductions exacerbates this problem as the input vectors can be physically distant in memory.

Figure 1:
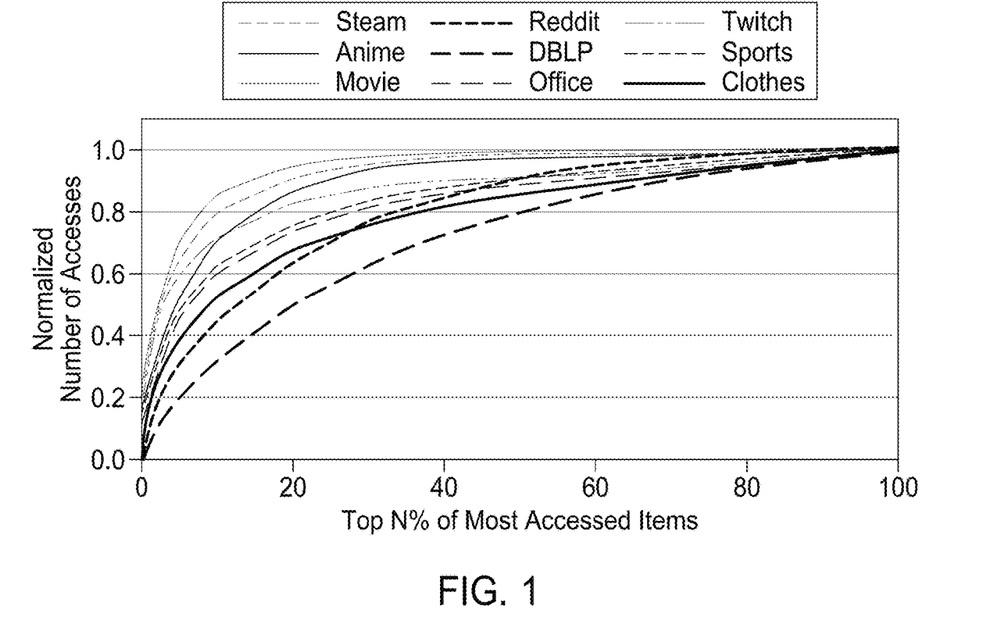
FIG. 1 is a graph showing power-law distribution of DLRM datasets.

As a result of investigating the data access patterns in the DLRM workload, one can find an opportunity to enable data co-location for PIM. FIG. 1 shows the power-law distribution of item access patterns by different users. The figure shows that the top 30% most frequently accessed items are accessed 84% of the time, on average.

Motivated by the crucial necessity of data co-location in PIM and the skewed item access pattern in DLRM workloads, a two-tier design is proposed. First, sort the item IDs based on their frequencies. This is achieved by examining the past user-item interactions to find item access frequencies and re-labeling the item IDs in the decreasing order of their frequencies. Such design optimization based on the runtime workload properties called profile-guided optimizations are widely deployed in today's data centers. Furthermore, re-labeling of items can be easily achieved using a remapping table, already used in DLRM workloads.

Figure 2:
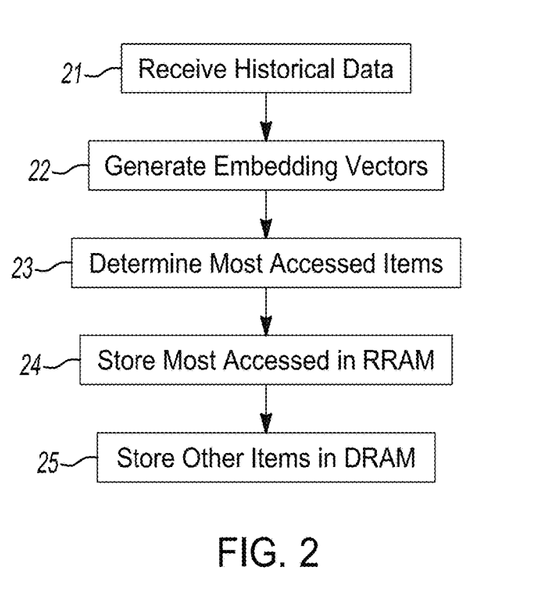
FIG. 2 depicts a technique for processing embedding layers of a recommendation model.

Second, map the top frequently accessed item embeddings to RRAM, and the rest of the items are mapped to DRAM. The intuition behind this design decision is the reduction of the most frequently accessed embedding vectors using RRAM PIM, and the remaining items are reduced on the CPU. This method for processing embedding layers of recommendation model are shown in FIG. 2.

As a starting point, a historical data set of items accessed by users of a computer system are received as indicated at 21 and embedding vectors for items contained in the historical data set of items are then generated at 22. Each entry in the historical data set indicates a subset of items accessed by a given user.

Next, the most frequently accessed items in the historical data set of items is determined 23 as will further described below. Embedding vectors for the most frequently accessed items are stored at 24 in a resistive random-access memory; whereas, embedding vectors for remaining items in the historical data set of items are stored at 25 in a dynamic random-access memory.

RecPIM maps each element of an embedding vector to one RRAM row. Different elements from the same vector are mapped to different RRAM arrays, allowing them to be used in parallel. That is, elements of a given embedding vector are partitioned across different memory devices and the elements from the given embedding vector are stored at same address in the memory devices. Different memory rows host different embeddings sorted by their access frequencies. Mapping frequent embedding vectors to the same RRAM array increases the chance of data co-location for PIM.

Access-Pattern-Aware Data Mapping is processed offline, and the data mapped to physical memory arrays is used for inference during the runtime. This is possible because datacenter operators profile the user-item interactions offline (e.g., a week) and use the updated system for inference (consecutive weeks).

The sparse embedding layers in DLRM typically reduce a large number of embedding vectors for each user individually. Although the compute operation itself is simple (i.e., floating point addition), element-wise reduction of hundreds of long vectors for each user result in large compute complexity.

By analyzing the item access patterns of different users in real-world DLRM models, one finds that many different users reduce similar frequently accessed item embeddings. Because a small subset (30%) of items are accessed a majority (84%) of the time, it is intuitive that similar embeddings are reduced multiple times by different users. This workload behavior leads to redundant memory accesses and computation that can be avoided.

To avoid redundant computations and improve the algorithmic complexity, reduction results are reused among multiple users. This is in stark contrast with how DLRMs currently operate, where the sparse features of different users are computed separately. Although RecPIM alters the operating principles, it does not impact the accuracy of DLRM.

The key idea behind this optimization is to identify the commonly reduced item embeddings across a set of users, and reuse their computation. The identification of common items is performed using an inverse-map of user-item interactions and applying a map-reduce process. Because RecPIM conducts this process at runtime it falls on the critical path of embedding reduction. Therefore, it is critical to minimize the latency of this logic. To this end, a rich trade-off space is found between the latency of common computation identification and the benefit of complexity reduction.

Figure 3:
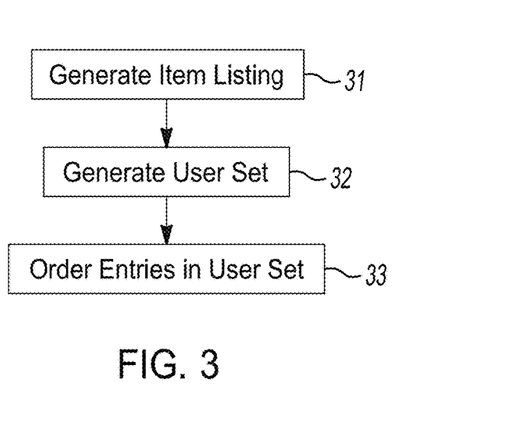
FIG. 3 is flowchart showing an exemplary technique for determining the most frequently accessed items.
Figure 4A:
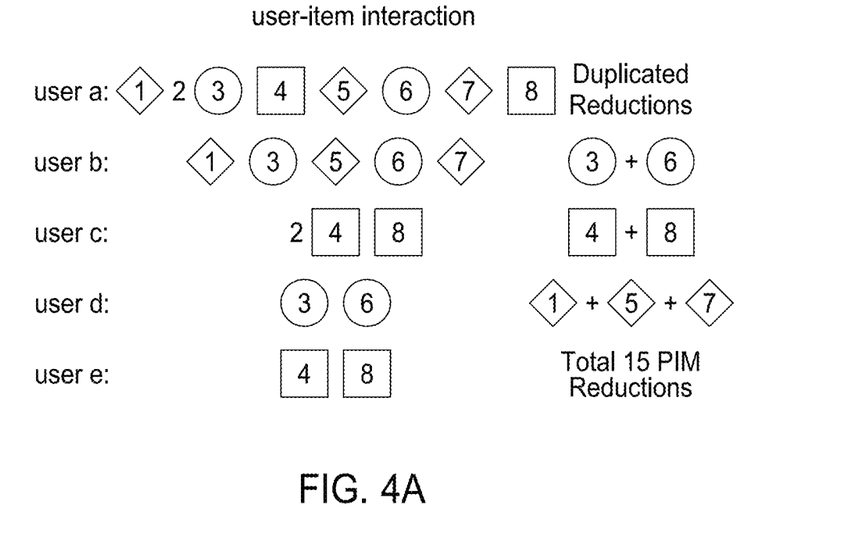
FIGS. 4A and 4B are diagrams showing a simplified reduction operation.

FIG. 3 depicts an exemplary technique for determining the most frequently accessed items. For illustration purposes, a simplified historical data set of items for five users is shown in FIG. 4A. As a baseline design, where all users are reduced individually, requires 15 reduction operations as shown in this figure. Starting the historical data set of items, the historical data set of items is converted at 31 to an item listing of common users. Each entry in the item listing of common users identifies a given item and a listing of users who accessed the given item.

Figure 4B:
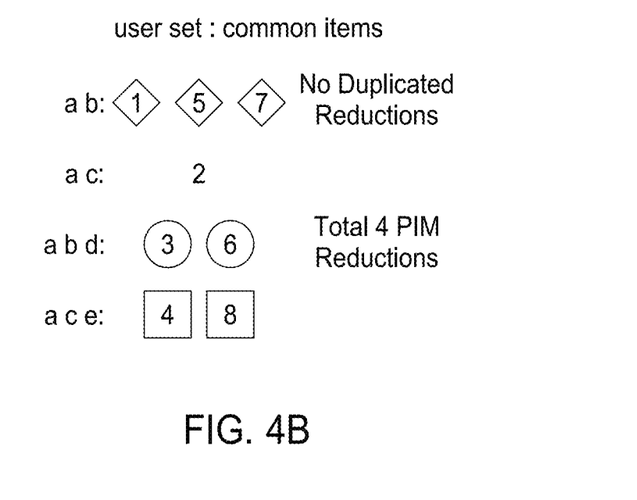

Next, a user set of common items is generated at 32 from the item listing of common users by combining entries in the item listing of common users with same listing of user. With reference to FIG. 4B, this approach reduces this computation to 4 reductions by reusing common computation among multiple users, resulting in a significant complexity reduction.

Finally, the entries in the user set of common items are ordered at 33 in descending order according to number of common items in each entry in the user set of common items. While grouping a large number of users results in a greater complexity reduction, it incurs an increase in the latency of the identification process. Grouping a small number of users, on the other hand, reverses this trend. To effectively navigate this trade-off space, one can empirically use a predetermined group size (e.g., 8 users) to balance the cost and benefit of this method. Furthermore, experiments show that the latency of generating common item sets can be completely hidden by computing it during the PIM computation of the previous batch.

Figure 5:
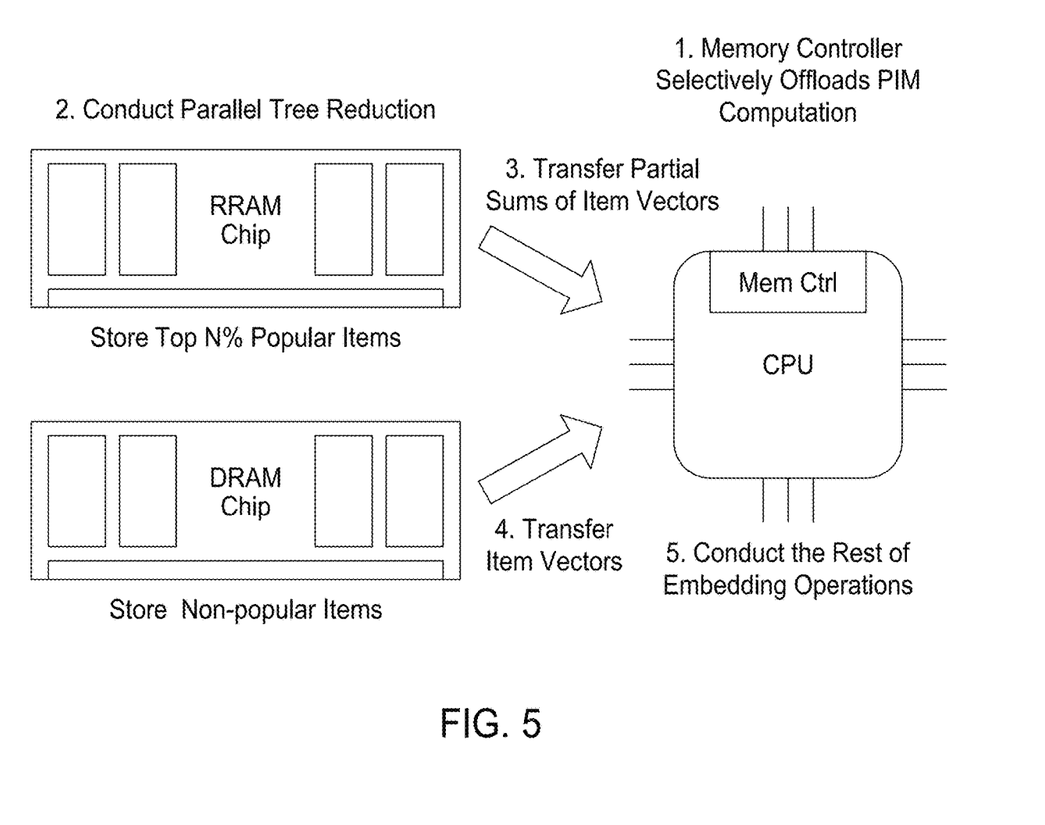
FIG. 5 is a diagram depicting an example implementation for the hybrid memory system.

FIG. 5 depicts an example implementation for the hybrid memory system. The hybrid memory system is comprised of one or more RRAM chips (collectively referred to herein as the resistive random-access memory), one or more DRAM chips (collectively referred to herein as dynamic random-access memory), and a central processing unit (CPU). A memory controller is implemented by the CPU.

During runtime execution, the memory controller receives a list of items for a particular user, where the particular user has shown an interest in each item on the list of items. For each item on the list of items, the memory controller either retrieves partial sums for given items from the resistive random-access memory or retrieves the given items directly from the dynamic random-access memory. Dimensionality reduction and other embedding operations are then performed by the memory controller on the CPU using the retrieved partial sums and the retrieved items.

It is also envisioned that the reduction operation may be performed in the resistive random-access memory. One of the key design challenges is the slow, bit-serial nature of PIM computations. That is, each reduction operation takes hundreds of cycles to compute. Therefore, unless the cost of one PIM reduction is amortized by computing several reductions in parallel, RRAM PIM will result in inferior performance compared to the CPU. However, the number of reductions that can be performed in parallel depends on the workload. It is possible to reduce a subset of embedding vectors stored in RRAM at the CPU as well, because the non-frequent item embeddings are read out of DRAM and reduced at the CPU (along with partial reductions from RRAM).

To offset the performance slowdown because of PIM's bit-serial computation, offloading reduction computations can be done selectively by the memory controller. The key idea of this optimization is to intelligently select between conducting reduction operations using PIM versus at the CPU. To this end, an analytical model is built to make this decision. The simplicity of this model is key to its practical utility in DLRM execution as this decision made at runtime.

In an example embodiment, define a threshold parameter $N_{thres}$ as $$N_{thres} = T_{PIM} \times BW_{mem}, \quad (1)$$

where $T_{PIM}$ and $BW_{mem}$ represent the latency of a PIM operation and the memory bandwidth, respectively. $N_{thres}$ defines the minimum number of PIM reductions to compute in parallel to offset the cost of one bit-serial reduction. At runtime, the memory controller compares the number of parallel reductions to be performed within an RRAM array with $N_{thres}$. If the number of concurrent operations is greater than $N_{thres}$, then the memory controller offloads PIM commands. Otherwise, transferring data off-chip and reducing on the CPU is beneficial. Therefore, instead of the RRAM performing PIM computation, the controller issues load requests to multiple embedding vectors to send the data to the CPU.

In this alternative embodiment, the memory controller implements selective offloading of reduction computations as follows. During runtime execution, the memory controller receives a list of items for a particular user, where the particular user has shown an interest in each item on the list of items. A determination is made as to the number of parallel reduction operations to be performed in the resistive random-access memory and this number of parallel reduction operations is compared to the threshold, $N_{thres}$.

When the number of parallel reduction operations is greater than the threshold, dimensionality reduction for items in the list of items is performed in the resistive random-access memory. Conversely, when the number of parallel reduction operations is less than the threshold, dimensionality reduction for items in the list of items is performed by the CPU.

TABLE 1

CHARACTERISTICS OF REAL-WORLD
DATASETS USED FOR EVALUATION

| Dataset (Idx+) | # Items | Avg. Pool. Factor | Freq. Item. (%)* |
|---|---|---|---|
| Steam (D1) [11] | 10,978 | 67 | 10 |
| Anime (D2) [12] | 11,200 | 106 | 20 |
| Movie (D3) [13] | 26,744 | 143 | 20 |
| Reddit (D4) [14] | 232,965 | 492 | 40 |
| DBLP (D5) [15] | 540,459 | 62 | 30 |
| Office (D6) [16] | 598,943 | 43 | 10 |
| Twitch (D7) [17] | 739,991 | 31 | 5 |
| Sports (D8) [16] | 1,505,707 | 62 | 5 |
| Clothes (D9) [16] | 2,345,346 | 50 | 10 |
| M1 | twi + mov + ani + stm | 342 | 10 |
| M2 | clo + off + dblp + ani | 262 | 10 |
| M3 | spo + off + dblp + twi | 187 | 10 |
| M4 | clo + spo + off + dblp | 218 | 10 |

+The index of each dataset for the results plotting.
*The proportion of top frequently accessed items that are stored in RRAM.

TABLE 2

MODELED SYSTEM PARAMETERS

| Emb. Table Characteristics | Precision | bfloat16 |
|---|---|---|
| | Embedding Vector Dimension | 64 |
| | Batch/Sub-Batch Size | 64 users/8 users |
| Technology Specification | RRAM/DRAM capacity | 4 GB/48 GB |
| | RRAM Crossbar Size | 1024 × 1024 |
| | MAGIC NOR Latency | 1.1 ns |
| | bfloat16 PIM Reduction Latency | 361 ns |
| | $N_{thres}$ (Section III-C) | 58 |
| | bfloat16 PIM Reduction Energy | 86.9 pJ/reduction [6] |
| DDR4 interface | Mem Interface | DDR4-3200 |
| | DDR4 Read Energy | 40 pJ/bit |

For evaluation purposes, various real-world datasets with different characteristics are shown in Table I. The datasets are listed in the order of the number of items (#Items). The average pooling factor is the average item access per user, and the frequent item is the proportion of top frequently accessed items that are stored in RRAM. The proportion is determined heuristically for maximum performance. M1 to M4 are the combined real-world datasets to showcase the effectiveness of RecPIM for the real-world deployment. For each dataset, randomly sample the data and assign 50% of the data to the training set and another 50% to the testing set. The frequently accessed item ranking is obtained from the training set and the embedding table operation is conducted with the testing set.

When storing the testing set data in the memory, RRAM is used to store frequently used items, and DRAM to store non-frequently used items. In RRAM, one crossbar row stores one embedding vector element, and the rest of the columns of the same row are used for PIM intermediate results. RecPIM uses bfloat16 precision, a half-precision format widely used in DL applications and has no accuracy drop for DLRM.

RecPIM design configuration is divided into RRAM and DRAM. RRAM stores the top frequently accessed items, conducts parallel tree reductions, and transfers the partial reduction results to the CPU. These partial sums from RRAM are then reduced with the item embeddings read from DRAM at the CPU. DRAM stores the non-frequently used items and transfers them to the CPU in parallel with the PIM reduction. Table II presents the technology-specific parameters of both DRAM and RRAM based on prior works.

For simulation, an in-house simulator was built to evaluate the performance, energy consumption, and lifetime of RecPIM. PIM reduction time and energy are modeled based on the Bitlet mode and FloatPIM model (see Table II). Because the sparse embedding reduction workload in DLRM is heavily memory intensive, one can ignore the host CPU and cache time/energy in the simulator. Results are cross-validated with Intel i9-9900K CPU. To verify the functional correctness of the simulation infrastructure, the embedding reduction results generated by our simulator are verified with traditional software implementation.

CPU baseline models a software implementation of DLRM used in today's data centers, and uses a DDR4 DRAM without PIM capability. All embedding vectors are read out of DRAM to the CPU for reduction.

PIM-only design stores all embedding vectors in the finite-size RRAM crossbars. This baseline fully reduces the embedding vectors using RRAM PIM without applying the proposed optimizations described above. This design exploits the row-level parallelism for tree-reduction and MAT-level parallelism for simultaneously reducing multiple vector elements. For large datasets, multiple RRAM chips are deployed. In contrast, RecPIM uses a single RRAM chip because RecPIM stores only the frequently used items in a RRAM chip.

SPACE is locality-aware processing as described by H. Kal et al in "Space: locality-aware processing in heterogeneous memory for personalized recommendation" in ISCA (2021). This is a state-of-the-art domain-specific hybrid memory system design using DIMM and HBM-based memories. Similar to our RRAM design, both DIMM and HBM in SPACE are compute capable. SPACE further optimizes the architecture by caching the partial sums of a subset of highly frequent items. Because of technological idiosyncrasies, RecPIM and SPACE are compared using iso-technology baselines (i.e., both RecPIM and SPACE with DIMM-HBM and DRAM-RRAM memory system designs).

Figure 6:
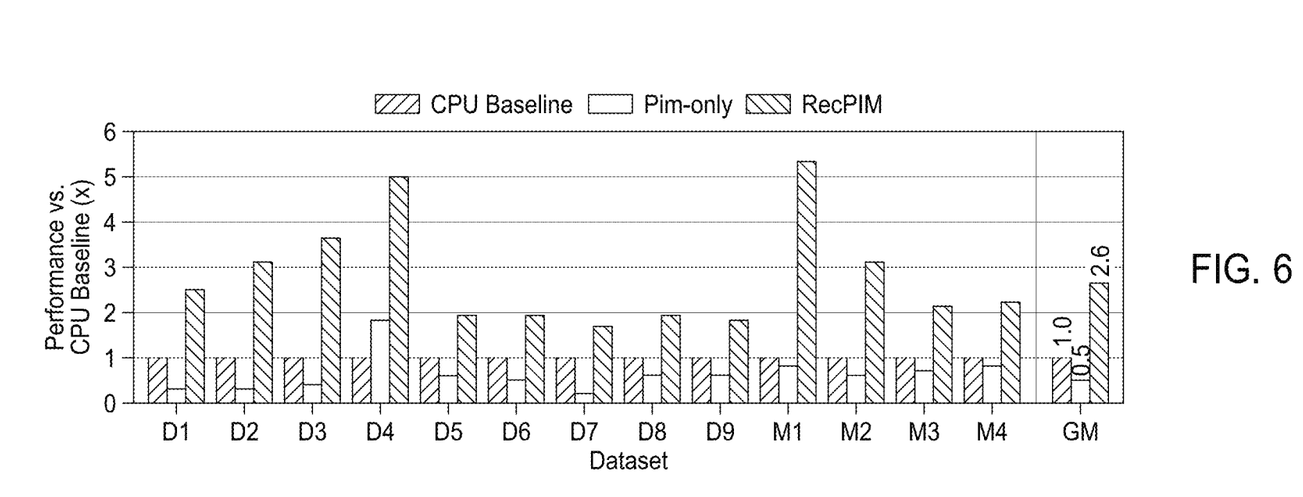
FIG. 6 is a graph comparing performance of RecPIM with CPU and PIM only implementations.

FIG. 6 compares the performance of RecPIM with CPU and PIM-only baselines. The figure shows that the PIM-only baseline degrades the performance of a CPU baseline by 0.5×, on average. This is because the PIM-only design suffers from long latency of floating point arithmetic operations in reducing embedding vectors. This result validates the initial hypothesis that traditional RRAM PIM, by itself, is inadequate to improve DLRM performance.

FIG. 6 further shows that RecPIM significantly outperforms CPU and PIM-only baselines by 2.6× and 4.8×, on average. These high speedups are attributed to the proposed design optimizations that (a) co-locate PIM input data to reduce in memory data transfers, (b) significantly reduce the computation complexity of the embedding layer, and (c) selectively execute PIM operations only when their benefits outweigh cost. This result underscores the value of proposed RecPIM design optimizations that elevate the average performance of traditional RRAM PIM by 4.8×.

Figure 7:
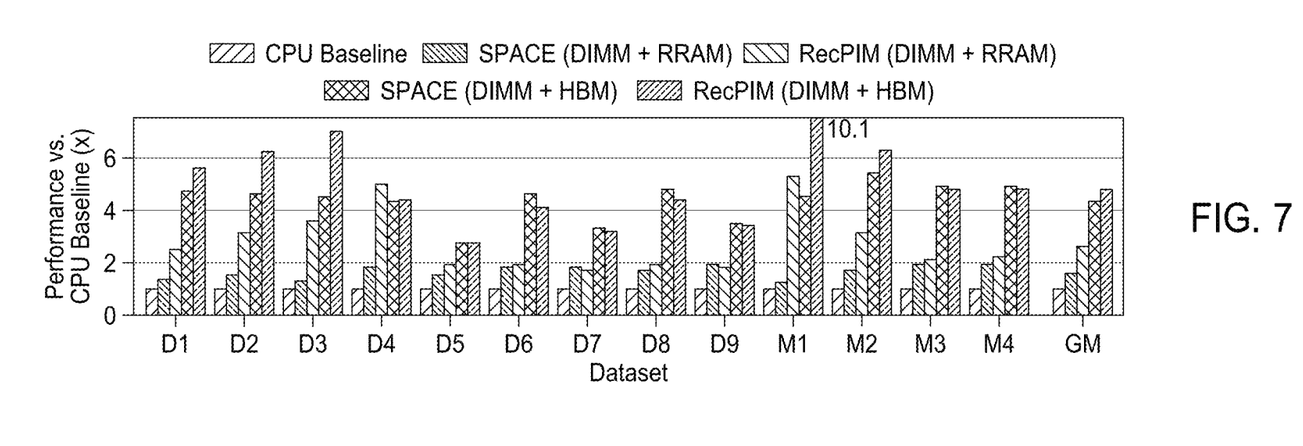
FIG. 7 is a graph comparing performance of RecPIM with SPACE implementation; where GM values are 1.0×, 1.6×, 2.6×, 4.3× and 4.8×, respectively.

FIG. 7 compares the performance of SPACE and RecPIM with a CPU baseline. For an isotechnology comparison, both SPACE and RecPIM are modeled using the same technology parameters (i.e., both DIMM+HBM and DRAM+RRAM). The figure shows that RecPIM consistently outperforms a state-of-the-art hybrid memory system design SPACE by 1.6× (for DRAM+RRAM) and 1.1× (for DIMM+HBM), on average. The superior performance of RecPIM compared to SPACE is due to exploiting massive PIM parallelism and improved memory traffic reduction.

Figure 8:
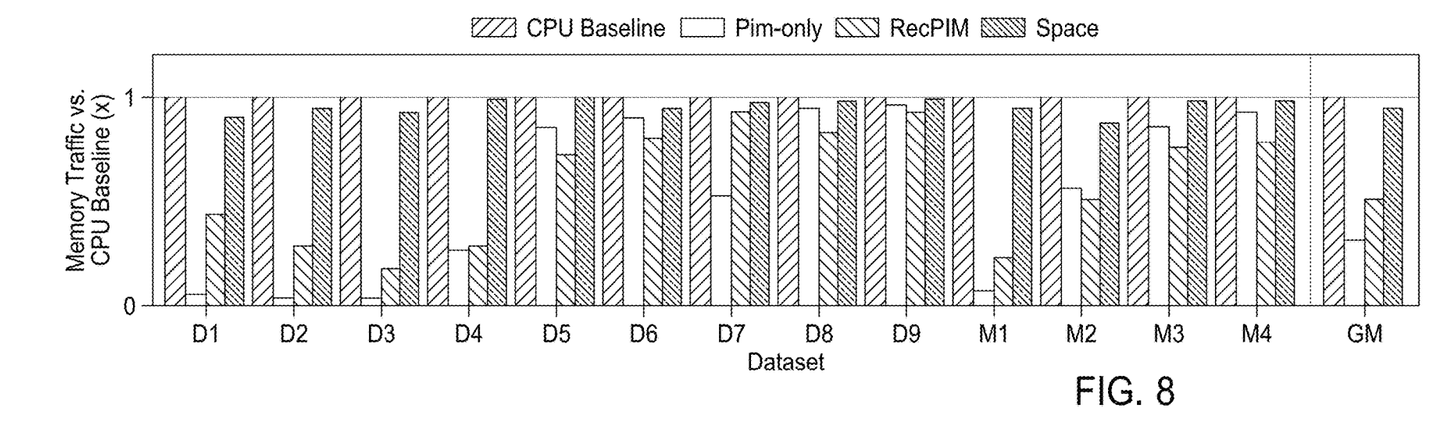
FIG. 8 is a graph comparing off-chip memory traffic of RecPIM (GM: 0.51×) with CPU (GM: 1.0×), PIM-only (GM: 0.31×) and SPACE (GM: 0.95×).

FIG. 8 compares the off-chip memory traffic reduction on PIM-only, RecPIM, and SPACE, normalized to a CPU baseline. By processing data within memory, RecPIM significantly reduces the memory traffic by 49%, on average. SPACE, on the other hand, only results in a 5% reduction in memory traffic that further corroborates the results in FIG. 7. Interestingly, the PIM-only baseline results in a greater memory traffic reduction, yet inferior performance, compared to RecPIM. Despite reducing more embedding vectors inside memory, the long latency of bit-serial PIM computation hurts the performance of PIM-only. Selective PIM Reduction in RecPIM carefully avoids PIM operations where parallelism cannot amortize the cost of bit-serial computation. This interesting result shows that a more significant memory bandwidth reduction does not always result in optimal system performance, given long latency of PIM operations.

Figure 9:
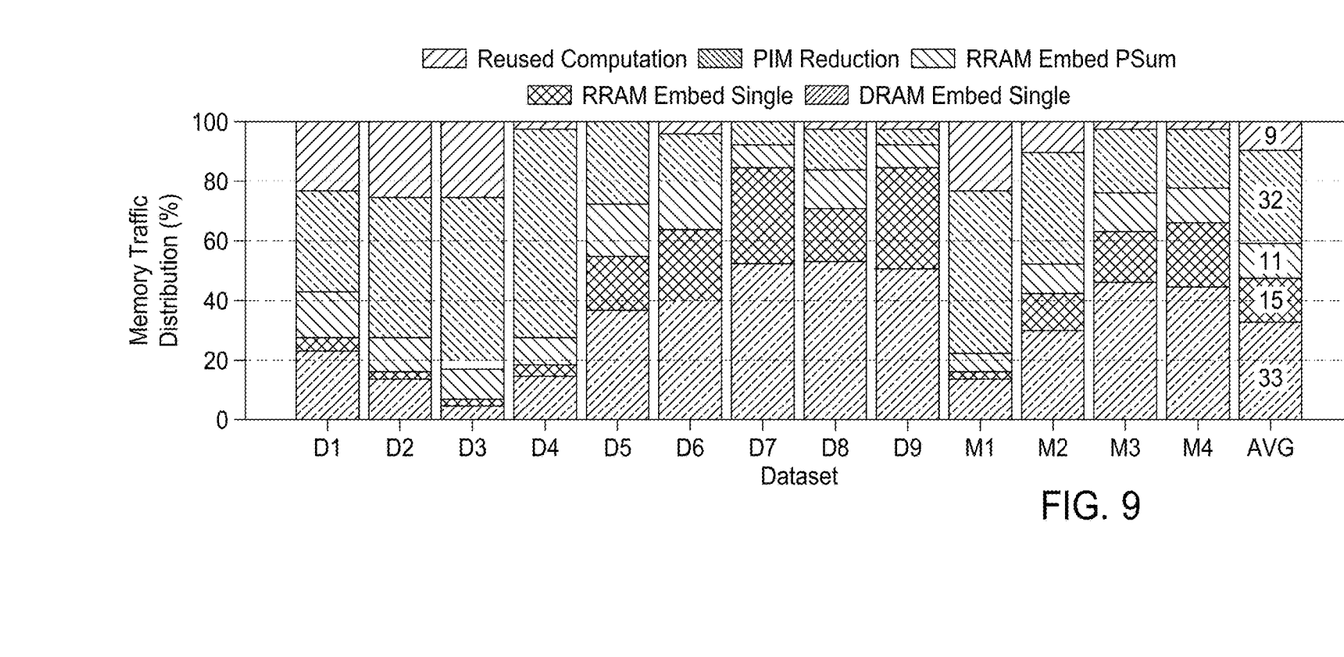
FIG. 9 is a graph showing the memory operation types in RecPIM.

FIG. 9 further shows the memory operation types in RecPIM normalized to off-chip data transfers in a CPU baseline. The figure shows that the computation reuse in RecPIM removes 9% of reductions, on average. Furthermore, RecPIM reduces 32% of data using PIM that saves off-chip data transfers. Examining individual workloads demonstrates a strong correlation between the fraction of reused computation plus PIM reductions with application speedup (see FIG. 6). The rest of the portions of the bars shows off-chip memory traffic in terms of 1) partial sum and 2) single embedding vector data transfer out of RRAM, and 3) single embedding vector data transfer out of DRAM. Off-chip memory traffic accounts for 59% of memory traffic (different than FIG. 8 as it computes geomean).

Figure 10:
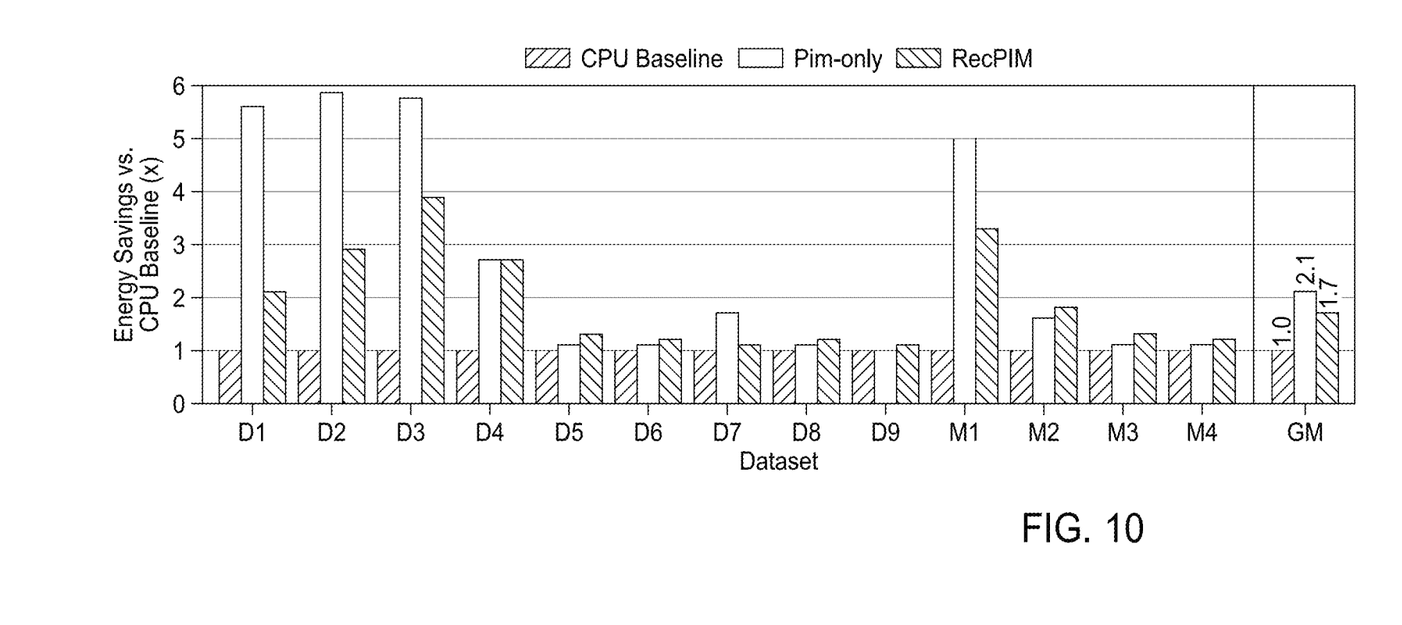
FIG. 10 is a graph comparing energy savings of RecPIM with CPU and PIM-only.

As shown in FIG. 10, RecPIM achieves an average of 1.7× energy reduction compared to the CPU baseline. As CPU-memory data transfers consume a large amount of energy, RecPIM saves energy by processing data on the memory device. Furthermore, RecPIM also optimizes the energy savings by avoiding redundant PIM reductions. While the PIM-only baseline results in a greater energy reduction than RecPIM, this is mainly because of the greater memory traffic reduction (FIG. 8). RecPIM, on the other hand, significantly improves performance, and results in a net EDP reduction of 4.4× and 4.0× compared to the CPU and PIM-only baseline, respectively.

RecPIM performance also changes for different values of $N_{thres}$. First, observe that $N_{thres}=58$ is the optimal performance point. But even if one perturbs $N_{thres}$ by 50%, the performance degrades by less than 4%. Since the performance is not sensitive to the $N_{thres}$, it can be modified depending on the design goal. $N_{thres}$ can be reduced to save memory traffic, or be increased to alleviate the wear-out of RRAM.

The impact of the RRAM technology parameter on RecPIM performance is also investigated. The chosen PIM latencies are 1.1 ns, 3 ns, 5 ns, 7 ns, and 10 ns. The optimal value of $N_{thres}$ increases from 58 to 525 and the average RecPIM performance changes from 2.6× to 1.7× as the PIM latency increases because additional parallelism is necessary to offset the longer PIM latency. The result shows that the Selective PIM Reduction optimization in RecPIM can adapt to tolerate longer PIM latencies to consistently deliver superior performance than a CPU baseline.

Lastly, the lifetime of RecPIM is improved. Without applying wear-leveling techniques, the baseline lifetime is 5-to-146 days when RRAM endurance is $10^{12}$ writes. Several wear-leveling techniques are adopted to spread out PIM computation across the memory fabric to improve the RRAM lifetime. First, distribute the intermediate results of MAGIC NOR operations across many different bitlines in the same array. Second, spread computations across the RRAM crossbar by modifying the data copying operation that aligns two embedding vectors in an RRAM wordline. Third, RRAM controller employs a periodic data remapping from one crossbar array to another. These techniques improve the lifetime of RecPIM by 1633×, on average, to reach more than 12 years.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for processing embedding layers of a model, comprising:
    receiving, by a computer processor, a historical data set of items accessed by users of a computer system, where each entry in the historical data set indicates a subset of items accessed by a given user;
    generating, by the computer processor, embedding vectors for items contained in the historical data set of items;
    determining, by the computer processor, most frequently accessed items in the historical data set of items;
    storing, by the computer processor, embedding vectors for the most frequently accessed items in a resistive random-access memory; and
    storing, by the computer processor, embedding vectors for remaining items in the historical data set of items in a dynamic random-access memory.

2. The method of claim 1 wherein storing, by the computer processor, embedding vectors for the most frequently accessed items further comprises partitioning elements of a given embedding vector across different memory devices comprising the resistive random-access memory and storing the elements from the given embedding vector at the same address in the memory devices.

3. The method of claim 1 wherein the most frequently accessed items is determined empirically to balance processing time between the resistive random-access memory and the dynamic random-access memory.

4. The method of claim 1 wherein determining most frequently accessed items further comprises converting, by the computer processor, the historical data set of items to an item listing of common users, where each item in the historical data set of items is represented by an entry in the item listing of common users and each entry in the item listing of common users identifies a given item and a listing of users who accessed the given item;

generating, by the computer processor, a user set of common items from the item listing of common users by combining entries in the item listing of common users with same listing of users; and ordering, by the computer processor, entries in the user set of common items in descending order according to number of common items in each entry in the user set of common items.

5. The method of claim 1 further comprises receiving a list of items for a particular user, where the particular user has shown an interest in each item on the list of items;

for each item on the list of items, retrieving partial sums for given items from the resistive random-access memory or retrieving the given items directly from the dynamic random-access memory; and performing a dimensionality reduction for items in the list of items using the retrieved partial sums and the retrieved items.

6. The method of claim 1 further comprises receiving a list of items for a particular user, where the particular user has shown an interest in each item on the list of items;

determining a number of parallel reduction operations to be performed in the resistive random-access memory and comparing the number of parallel reduction operations to a threshold;

performing dimensionality reduction for items in the list of items in the resistive random-access memory when the number of parallel reduction operations is greater than the threshold; and performing dimensionality reduction for items in the list of items using the computer processor when the number of parallel reduction operations is less than the threshold.

7. The method of claim 6 wherein the threshold is defined as a product of time to process one reduction operation and memory bandwidth.

8. A computer-implemented method for processing embedding layers of a model, comprising:

receiving, by a computer processor, a historical data set of items accessed by users of a computer system, where each entry in the historical data set indicates a subset of items accessed by a given user;

converting, by the computer processor, the historical data set of items to an item listing of common users, where each item in the historical data set of items is represented by an entry in the item listing of common users and each entry in the item listing of common users identifies a given item and a listing of users who accessed the given item;

generating, by the computer processor, a user set of common items from the item listing of common users by combining entries in the item listing of common users with the same listing of users;

ordering, by the computer processor, entries in the user set of common items in descending order according to the number of common items in each entry in the user set of common items;

storing, by the computer processor, entries from the user set of common items with large number of common items in a resistive random-access memory; and storing, by the computer processor, entries from the user set of common items with small number of common items in a dynamic random-access memory.

\* \* \* \* \*

UNITED STATES PATENT AND TRADEMARK OFFICE
CERTIFICATE OF CORRECTION

| | | |
|---|---|---|
| PATENT NO. | : 12,399,946 B1 | Page 1 of 1 |
| APPLICATION NO. | : 18/795332 | |
| DATED | : August 26, 2025 | |
| INVENTOR(S) | : Heewoo Kim et al. | |

It is certified that error appears in the above-identified patent and that said Letters Patent is hereby corrected as shown below:

On the Title Page

At Column 1, item (72) Inventors, Line number 5, delete "AnnArbor," and insert --Ann Arbor--.

Signed and Sealed this
Eleventh Day of November, 2025

John A. Squires
*Director of the United States Patent and Trademark Office*